Figure 1:
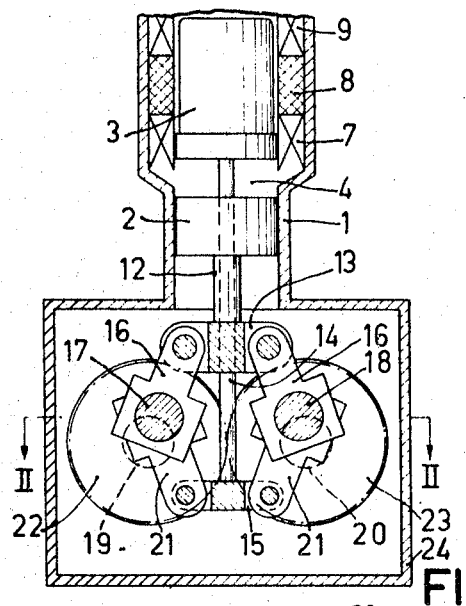

July 8, 1969     R. J. MEIJER     3,454,779

COUPLING DEVICE FOR DUAL ROTARY SHAFTS

Filed Dec. 1, 1966

INVENTOR.
ROELF J. MEIJER

BY

AGENT

United States Patent Office 3,454,779
Patented July 8, 1969

3,454,779
COUPLING DEVICE FOR DUAL ROTARY SHAFTS
Roelf Jan Meijer, Emmasingel, Eindhoven, Netherlands, assignor to U.S. Philips Corporation, New York, N.Y., a corporation of Delaware
Filed Dec. 1, 1966, Ser. No. 598,439
Claims priority, application Netherlands, Dec. 8, 1965, 6515922
Int. Cl. H02p 9/04
U.S. Cl. 290—1        6 Claims The invention relates to a device comprising a hot-gas engine of a displacer type which is provided with at least one pair of equal cranks located on either side of a plane through the centre line of the engine and forming part of two crankshafts rotating in opposite directions and synchronously in phase relative to one another, the center lines of said shafts extending mutually in parallel and being located on either side of the said plane through the center line of the engine, each pair of cranks belonging together being connected to at least one piston and at least one displacer cooperating therewith, a piston driving rod and a displacer driving rod, respectively, being arranged in the connection between each of the cranks and the pistons and the displacers, respectively, the components of the piston driving rods moving in a straight line being located on one side and the components of the displacer driving rods moving in a straight line being located on the other side of the plane through the center line of the crankshaft, the two crankshafts being coupled together by intermeshing toothed wheels and at least one of the crankshafts being connected to a device to be driven.

In known devices of the type to which the present invention relates one of the crankshafts is coupled directly or through a transmission to the device to be driven. This means that the mass moment of inertia of this crankshaft increased by the mass moments of inertia of the components connected thereto will be larger than the mass moment of inertia of the other crankshaft. As a result of this and as a result of the fluctuating torque it will be necessary to impose high requirements upon the teeth tolerances of the synchromesh wheels and upon the bearing tolerances in connection with the noise level.

Since in these known engines, only one crankshaft is connected to the device to be driven, the torque of the other crankshaft will consequently be transmitted to the device to be driven through the synchromesh wheels. Half of the power supplied by the motor is consequently transmitted through a toothed wheel transmission. Naturally this involves loss of power, and wear of the toothed wheels. In order to minimize this a good lubrication of these toothed wheels is required. This necessitates of course, the frequent replenishing of the lubricating oil which, in circumstances, is highly undesirable.

In order to mitigate all these drawbacks the device according to the invention is characterized in that each of the crankshafts is directly connected to a device to be driven, each of the said devices to be driven requiring at least substantially the same power.

Because each of the crank shafts is coupled to a device to be driven, no power will be transmitted through the synchromesh wheels. Actually, these serve only for synchronization.

In addition, the two crankshafts will have the same inertia moment, so that for that reason also no loads of the synchromesh wheels will occur.

Since in this case substantially no power is transmitted through the synchromesh wheels, the lubrication also need no longer meet such high requirements so that replenishing with oil is less frequently necessary. In circumstances and with the correct choice of the material of the toothed wheels, for example, nylon toothed wheels, it is even possible that they operate without any lubrication.

The devices to be driven may be, for example, two centrifugal pumps.

In a further favourable embodiment of the device according to the invention the device to be driven is a device for producing electric current which device comprises two rotors which are each directly coupled to a crankshaft of the hot gas engine, the magnets cooperating with each of the rotors being incorporated in a common frame.

In addition to its compactness of structure, an advantage of this device is the fact that now two oppositely rotating rotors are provided with the same mass moment of inertia so that no trouble is experienced by the gyroscopic effect. This may be of importance when the device according to the invention is used in vehicles, vessels or aircraft.

A further favorable embodiment of the device is characterized in that the magnets are electromagnets and the energisation windings are arranged in series.

Figure 2:
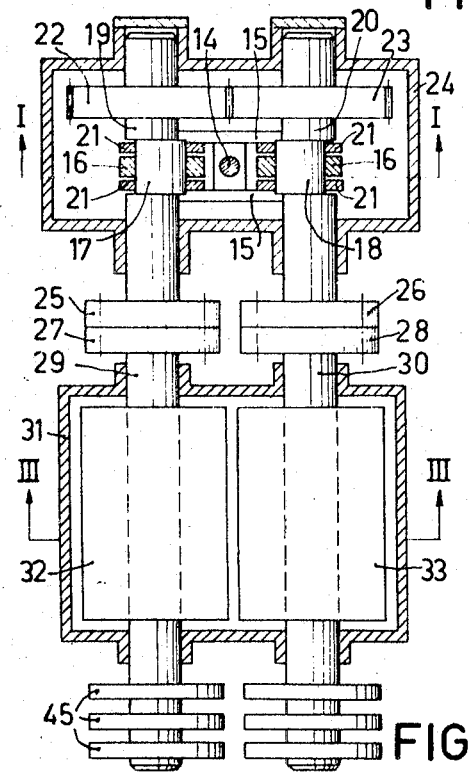
Figure 3:
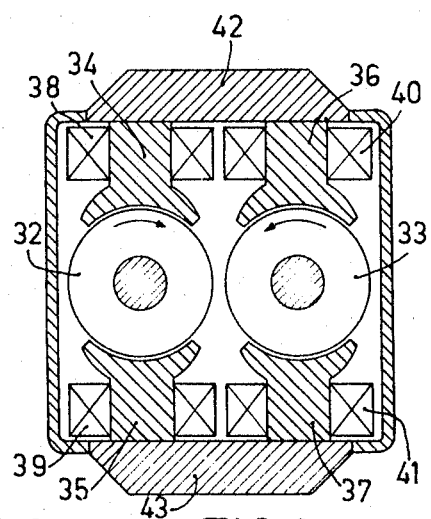

In order that the invention may readily be carried into effect, it will now be described in greater detail, by way of example, with reference to the accompanying drawing, in which:

FIGURES 1, 2 and 3 are three diagrammatic cross-sectional views, not to scale, of a hot-gas engine and a device for producing electric current which is coupled thereto. Mainly those components are shown which are of importance for a good understanding of the invention, while other components are not shown to avoid complexity of the drawing.

Figure 4:
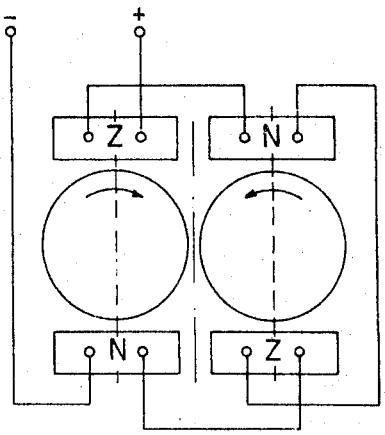

FIGURE 4 diagrammatically shows the sequence of the energisation winding of the magnets.

Reference numeral 1 denotes a cylinder in which a piston 2 and a displacer 3 reciprocate shifted in phase. Between the upper side of the piston 2 and the lower side of the displacer 3 a compression space 4 is present, while above the displacer 3 an expansion space 5 is present. The compression space 4 and the expansion space 5 communicate with one another through a cooler 7, a regenerator 8, and a heater 9. A burner (not shown) can supply heat to the heater 9.

The piston 2 is connected to a yoke 13 by a piston rod 12. The displacer 3 is connected to a yoke 15 by a displacer rod 14.

At its two ends the yoke 13 is rotatably secured to the piston driving rods 16 which in turn are coupled to the cranks 17 and 18, respectively, of the crankshafts 19 and 20, respectively. At its two ends the yoke 15 is rotatably secured to the displacer driving rods 21 which are connected with their other ends to the cranks 17 and 18, respectively.

The synchromesh wheels 22 and 23, respectively, are provided on the crankshafts 19 and 20 and ensure that said crankshafts cannot perform an angular displacement relative to one another.

Outside the crank casing 24 the crankshafts 19 and 20 comprise flanges 25 and 26 which are coupled, by bolts, to the flanges 27 and 28, respectively, on the shafts 29 and 30, respectively.

The crankshafts 19 and 20 are journalled in the crank casing 24 while the shafts 29 and 30 are journalled in an enveloping housing 31 at the places shown in the drawing. All the bearings are shown diagrammatically as sliding bearings, but it will be clear that other types of bearings may be used also.

Rotors 32 and 33 which are constructed in a manner commonly used in generators are arranged on the shafts 29 and 30.

The rotors 32 and 33 cooperate with the magnets 34 and 35 and 36 and 37, respectively, the magnets being surrounded in normal manner by the associated energization windings 38, 39, 40 and 41.

The magnets 34 and 36 are connected by the locking member 42 while the magnets 35 and 37 are connected by the locking member 43.

As is diagrammatically shown in FIGURE 4, the energization windings are connected in series, 34 and 37 forming south poles and 36 and 35 forming north poles.

As appears from the drawing, a generator is obtained having two rotors and one common stator which results in an extremely compact structure, the rotors and magnets being arranged in one common magnetic circuit.

The ends of the shafts 29 and 30 remote from the hot-gas engine comprise sliding rings 45 from which the current produced can be derived in normal manner.

Since the rotors 32 and 33 consume the same power during rotation, both crankshafts 19 and 20 are loaded equally heavily. This means that half of the power available in the hot-gas engine is directly transmitted to the rotor 32 through the crankshaft 19, while the other half of the power is transmitted directly to the rotor 33 through the crankshaft 20. This means that no power is transmitted from one crankshaft to the other through the synchromesh wheels 22 and 23. So these synchromesh wheels actually serve only for synchronization so that no high requirements need be imposed upon the lubrication.

Another favourable factor is that now the mass moments of inertia of the two crankshafts 19 and 20 and the components connected thereto are equally large.

Since the crankshafts 19 and 20 and the rotors 32 and 33, respectively connected thereto rotate in opposite directions the gyroscopic effect of the one is exactly compensated by that of the other. This is favorable if the aggregate is arranged in vehicles and the like.

In addition to the above-mentioned advantages the device as shown has a particular compact structure.

Although the drawing shows a monocylinder hot-gas engine as a driving device, it will be clear that multicylinder hot-gas engines may be used in which the said advantages are maintained.

What is claimed is:

1. A device comprising an engine such as a hot gas engine of the displacer type having two rotary outputs in combination with apparatus to be driven having two substantially equal loads for drive connection with said outputs, the engine including: (a) concentric piston and displacer drive rods driven in relative axial movement, (b) two crankshafts mounted for synchronous rotation in opposite directions, the center lines of the shafts extending mutually in parallel and being located on either side of a plane through the center line of the engine, (c) a pair of identical cranks, one located on each shaft, (d) links connecting each crank to both drive rods, each rod having straight line movement out-of-phase with the other, and (e) a pair of intermeshing gears, one rotatably carried by each shaft.

2. A device as claimed in claim 1, characterized in that the apparatus to be driven produces electric current, and comprises two rotors which are each directly coupled to a crankshaft of the hot gas engine, the apparatus having magnets cooperating with each of the rotors and being incorporated in a common frame.

3. A device as claimed in claim 2, characterized in that the magnets are electromagnets and the energizing windings are arranged in series.

4. A device as claimed in claim 3, characterized in that the magnets located on the same side are connected by a locking member, so that the magnets and rotors are included in a common circuit.

5. Apparatus as defined in claim 1 wherein the mass moment of inertia of each crankshaft and rotating components connected thereto is equal.

6. Apparatus as defined in claim 5 wherein the equally loaded shafts preclude the transmission of power between the shafts through the gears.

References Cited

UNITED STATES PATENTS 2,698,394  12/1954  Brown _____ 290—1 X

ORIS L. RADER, *Primary Examiner.*

W. E. DUNCANSON, JR., *Assistant Examiner.*

U.S. Cl X.R.

310—112